United States Patent
Sengoku et al.

(10) Patent No.: US 9,243,919 B2
(45) Date of Patent: Jan. 26, 2016

(54) NAVIGATION SERVER, NAVIGATION DEVICE, AND NAVIGATION SYSTEM

(75) Inventors: Koji Sengoku, Tokyo (JP); Tadafumi Nogawa, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 23 days.

(21) Appl. No.: 13/988,805

(22) PCT Filed: Oct. 27, 2011

(86) PCT No.: PCT/JP2011/074794
§ 371 (c)(1),
(2), (4) Date: May 22, 2013

(87) PCT Pub. No.: WO2012/070357
PCT Pub. Date: May 31, 2012

(65) Prior Publication Data
US 2013/0238243 A1    Sep. 12, 2013

(30) Foreign Application Priority Data
Nov. 26, 2010   (JP) .................................. 2010-263406

(51) Int. Cl.
*G01C 21/34* (2006.01)
*G08G 1/0968* (2006.01)
*G09B 29/10* (2006.01)

(52) U.S. Cl.
CPC ............ *G01C 21/34* (2013.01); *G01C 21/3415* (2013.01); *G08G 1/096811* (2013.01); *G09B 29/106* (2013.01)

(58) Field of Classification Search
CPC .... G01C 21/26; G01C 21/34; G01C 21/3626; G01C 21/2691; G01C 21/6913; G01C 21/3415; G08G 1/096811; G09B 29/106
USPC ............................................... 701/24–26, 537
See application file for complete search history.

(56) References Cited

U.S. PATENT DOCUMENTS

| 6,278,941 B1 * | 8/2001 | Yokoyama | 701/420 |
| 6,405,130 B1 * | 6/2002 | Piwowarski | G01C 21/3407 340/990 |

(Continued)

FOREIGN PATENT DOCUMENTS

| CN | 101688784 | 3/2010 |
| JP | 2000-020870 | 1/2000 |

(Continued)

OTHER PUBLICATIONS

European Search Report dated May 19, 2014, 8 pages.

(Continued)

*Primary Examiner* — Fadey Jabr
*Assistant Examiner* — Aaron L Troost
(74) *Attorney, Agent, or Firm* — Rankin, Hill & Clark LLP

(57) ABSTRACT

Provided is a navigation system and the like capable of improving the utility value of the navigation route in response to a current request in consideration of a user position. In the navigation system of the present invention, when a current request Req(i)(i>1) including a current destination position $p_2(i)$ that is the same as a previous destination position $p_2(i-1)$, is made from a navigation device 200, a current support route R(i) is searched which has a location point $p_1(i)$ that is on a previous support route R(i−1) and distant from the user position $p_0(i)$ by a designated distance or more included in the request Req(i), as a starting point.

5 Claims, 3 Drawing Sheets

(56) References Cited

U.S. PATENT DOCUMENTS

| | | | |
|---|---|---|---|
| 2006/0224302 A1* | 10/2006 | Kwok et al. | 701/200 |
| 2008/0059061 A1* | 3/2008 | Lee | 701/209 |
| 2009/0271109 A1* | 10/2009 | Lee et al. | 701/208 |
| 2010/0185387 A1* | 7/2010 | Sengoku | G01C 21/3415 701/533 |

FOREIGN PATENT DOCUMENTS

| | | |
|---|---|---|
| JP | 2002-202135 | 7/2002 |
| JP | 2004-184107 | 7/2004 |
| JP | 2005-025037 | 1/2005 |
| JP | 2008-232836 | 10/2008 |
| JP | 2009-019924 | 1/2009 |
| JP | 2009-121879 | 6/2009 |

OTHER PUBLICATIONS

Chinese Office Action with English Translation dated Feb. 2, 2015, 14 pages.

\* cited by examiner

NAVIGATION SERVER, NAVIGATION DEVICE, AND NAVIGATION SYSTEM

TECHNICAL FIELD

The present invention relates to a navigation server and the like which supports a guidance of a mobile body by a navigation device on the basis of communication with the navigation device.

BACKGROUND ART

There has been proposed a technique of searching for a support route by a navigation server for guiding a user of a navigation device to a destination position according to a request from the navigation device, and then searching for a navigation route based on an information according to the search result of the navigation server or reproducing the support route, by the navigation device (refer to Patent Document 1).

A current navigation route for guiding a user to a destination position is generated by combining a first navigation route searched by the navigation device independent of a search result of a navigation server and a second navigation route according to the search result of the navigation server. By doing so, it is aimed to reduce or resolve the effect of a time lag between the navigation device transmitting a request to the navigation server and receiving an information according to the search result of a supporting route from the navigation server (refer to Patent Document 2).

PRIOR ART DOCUMENTS

Patent Documents

Patent Document 1: Japanese patent application laid open publication No. 2004-184107
Patent Document 2: Japanese patent application laid-open publication No. 2009-019924

SUMMARY OF THE INVENTION

Problems to be Solved by the Invention

However, the elimination of the effect of time lag as described above has not been considered in a case where a current request is made after the navigation route has been generated based on the search result of the support route. Therefore, there is a possibility that the utility value of the navigation route is impaired in view of the user's position which continuously changes even after the current request.

In this regard, it is an object of the present invention to provide a navigation system and the like which enables to improve the utility value of the navigation route according to the current request in consideration of the user's position.

Means for Solving the Problem

In order to solve the above problem, the navigation server of the present invention is a navigation server for supporting a guidance of a user by a navigation device based on communication with the navigation device comprising, a first support arithmetic processing unit configured to search for a support route for guiding the user to a destination position based on communication with the navigation device, on a condition that a request including a position of the user and the destination position is recognized, and a second support arithmetic processing unit configured to make the navigation device recognize a location, point or a link included in the support route searched by the first support arithmetic processing unit based on communication with the navigation device, wherein the first support arithmetic processing unit is configured to search for a current support route having a location point which is on a previous support route and which is a designated distance or more distant from the position of the user included in a current request, as a starting point, on a condition that the current request including the destination position that is the same as the previous support route is recognized.

The navigation device for solving the problem is a navigation device for guiding a user based on communication with the navigation server comprising, a first arithmetic processing unit configured so that the navigation device recognizes a position of the user and a destination position, and to make the navigation server recognize a request including the position of the user and the destination position, and a second arithmetic processing unit configured to recognize a location point or a link included in a support route searched by the navigation server according to the request, and to search and output a navigation route based on the recognition result.

A navigation system for solving the problem is characterized in that it is configured by the navigation server and the navigation device.

According to the navigation system, and the navigation server and the navigation device which are the elements thereof (hereinafter arbitrarily referred to as "navigation system and the like") of the present invention, according to a request including the user position and the destination position from the navigation device, the support route for guiding the user to the destination position is searched by the navigation server. Furthermore, according to the location point or the link included in the support route as a search result of this support route, the navigation route is searched and output by the navigation device. With this arrangement, the user is able to move being guided by the navigation device according to the navigation route.

Thereafter, in a cases where there is a current request including the same destination position from the navigation device, the current support route which has the location point which is on the previous support route and which is away from the user position for a designated distance or more included in the request as the starting point, is searched. "Designated distance" is set to a value equal to or more than a predicted moving distance of the user during the time period (time lag) after the request from the navigation device to the navigation server, until the current navigation route is searched and output by the navigation device according to the request.

In this regard, when the current navigation route according to the current request is output to the navigation device, the current navigation route will start from the user position at that time point or from a position closer to the destination position than this user position. Especially, in a case where the user is travelling according to the navigation route based on the search result of the support route according to the previous request, the current navigation route starts from the route on which the user is travelling.

Therefore, the user is not forced to return back or change the course considerably or the like, and can smoothly travel along the current navigation route. Therefore, the utility value of the navigation route according to the current request is improved in consideration of the user position.

The first support arithmetic processing unit may be configured to recognize a factor which affects a traveling form of the user, and to set the designated distance or the starting point of the current support route according to the factor.

According to the navigation system or the like of such configuration, the current navigation route which has an appropriate position as the starting point can be searched and output in view of the factor effecting the traveling form of the user. As such, the user can travel smoothly according to the current navigation route without being forced to return back or change the course considerably or the like. Therefore, the utility value of the navigation route according to the current request is improved in consideration of the user position.

In the navigation device, the first arithmetic processing unit may be configured to search for a navigation route connecting the user and the destination position independent of the support route, and to make the navigation server recognize the request further including an intermediate position included in the navigation route.

Here, an element of the present invention "recognizes" an information means to execute all kinds of information processing in order to prepare the information for other information processing such as the element receiving the information, search or reading out the information from a database or a memory, arithmetic processing based on basic information received or the like to calculate, estimate, set, determine, search, etc., the information, actualizing the information by decoding the packet, furthermore, storing the information calculated or the like in the memory, or the like.

An element of the present invention "outputs" information means to output the information by displaying, audio output, vibration output or the like, that is, by all kinds of forms that a human being can recognize through their senses like eyesight, hearing, touch, or the like.

An element of the present invention being "configured to" perform arithmetic processing in charge means that the element reads or the like the necessary program and data from the memory, and then based on the data, to have the function to perform the arithmetic processing in charge according to the program, or furthermore to be programmed as such.

DETAILED DESCRIPTION OF THE PREFERRED EMBODIMENTS (Configuration of the Navigation System)

Figure 1:
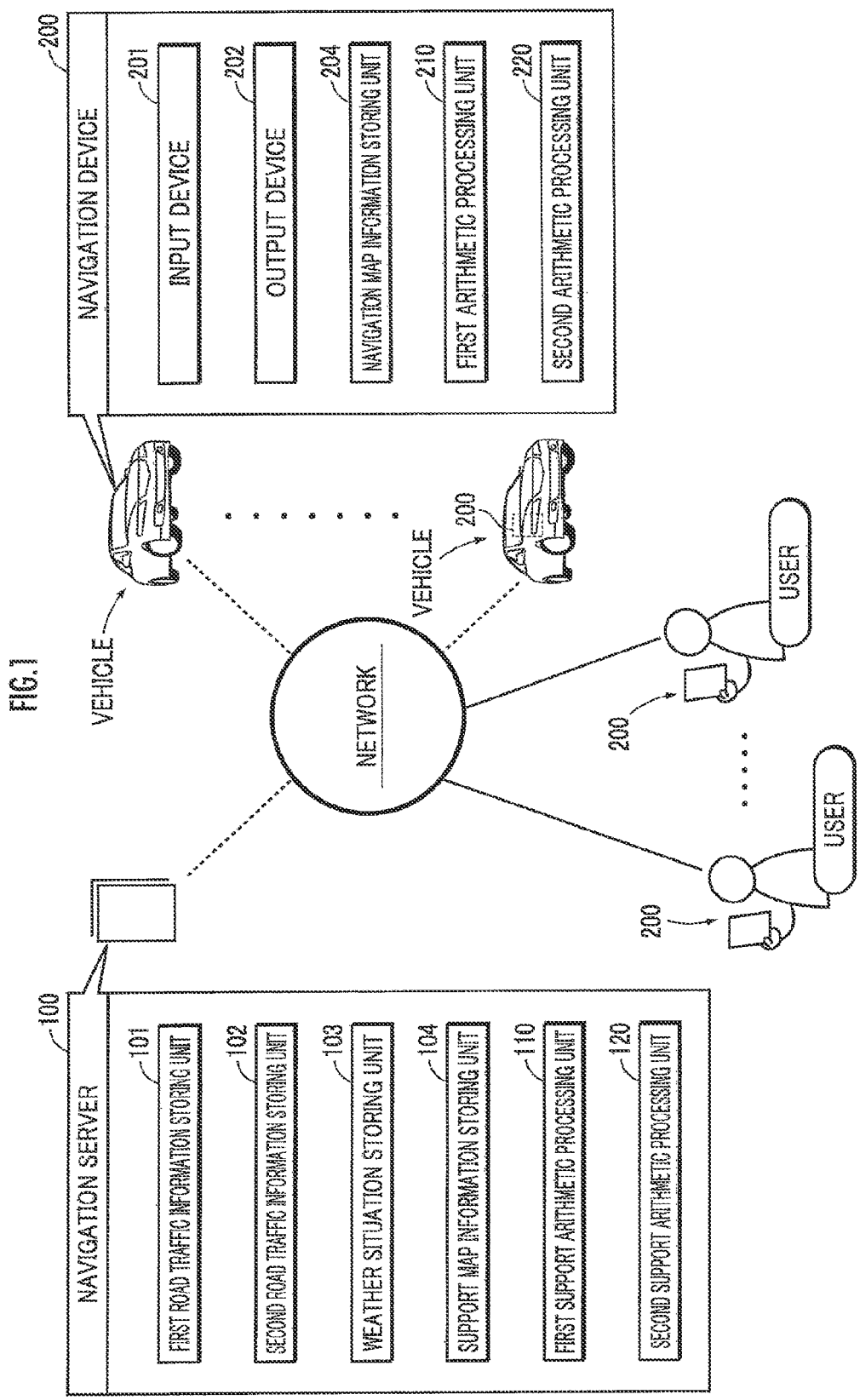
FIG. 1 is a configuration diagram of a navigation system of the present invention.

The navigation system illustrated in FIG. 1 is configured from a navigation server 100 and a navigation device 200 mounted on a vehicle. The navigation device 200 may be detachably mounted on the vehicle, or may be carried by a user as a mobile terminal device.

The navigation server 100 is configured from one or a plurality of server computers. The navigation server 100 is equipped with a first road traffic information storing unit 101, a second road traffic information storing unit 102, a weather condition storing unit 103, a support map storing unit 104, a first support arithmetic processing unit 110, and a second support arithmetic processing unit 120.

The storing units 101 to 104 are configured from storage devices configured of memories and the like. A part of or all of the storing units 101 to 104 may be an element of a data base server separate from the server computer having the first support arithmetic processing unit 110 and the second support arithmetic processing unit 120 as its elements.

Each of the first support arithmetic processing unit 110 and the second support arithmetic processing unit 120 is configured of a software and a hardware such as the memory for storing the software and an arithmetic processing unit (CPU) or the like which reads the software from the memory and executes a designated calculation processing. Each of the first support arithmetic processing unit 110 and the second support arithmetic processing unit 120 may be configured of a separate hardware which is at least partially able to cooperate.

The first road traffic information, storing unit 101 is stored with a first road traffic information (required moving time, degree of a traffic jam and the like in each link) based on a probe information (position of respective probe car at each time) transmitted or uploaded from the navigation device 200 mounted on the vehicle as a probe car or a floating car to the navigation server 100.

A second traffic information storing unit 102 is stored with a second road traffic information (required moving time, degree of a traffic jam in each link, and also information representing existence or non-existence of traffic regulations in each link, and information representing the existence or non-existence of an event in the vicinity of each link and the type of the event, or the like) transmitted from a road traffic information center server and the like to the navigation server 100.

The weather condition storing unit 103 is stored with weather information and the like in the vicinity of each link transmitted from a weather information center server and the like to the navigation server 100.

The support map storing unit 104 is stored with a support map information. In the support map information, a location, shape and posture or the like of each link constituting a road are expressed by a series of coordinates ((latitude, longitude), or (latitude, longitude, altitude)). Moreover, each link is tagged with link identification information for identifying each link, and data representing a road type.

The first support arithmetic processing unit 110 is configured to recognize a request Req(i) including a position $p_0(i)$ of the user of the navigation device 200 or the vehicle mounted with the navigation device 200 at time $t_i$ and a destination position $p_2(i)$, on the basis of communication with the navigation device 200. The first support arithmetic processing unit 110 is configured to search a support route R(i) for leading or guiding the user from the position p(ti) to the destination position $p_2(i)$ according to the request Req(i).

"i" is an index expressing the number of times of the request which can be reset to zero each time an IGN switch or an ACC switch of the vehicle is switched to ON from OFF by the user, or each time the navigation device 200 is operated in a designated manner by the user.

On the occasion of searching the support route R(i), the first road traffic information stored in the first road traffic information storing unit 101, the second road traffic information stored in the second road traffic information storing unit 102, the weather information and the like stored in the weather condition storing unit 103, and the support map information stored in the support map storing unit 104, are used.

The second support arithmetic processing unit 120 is configured to make the navigation device 200 recognize coordinate information of a location point included in the support route R(i) searched by the first support arithmetic processing unit 110 or information regarding the link as link identification information, on the basis of communication with the navigation device 200.

The navigation device 200 is composed of an ECU or a computer as a hardware mounted in the vehicle, and a software which is stored in the memory and which provides the computer with various functions. The software may be pre-installed in the memory (ROM) in the vehicular computer, or a part of or all of the software (program) may be downloaded or broadcasted from a server (not shown) via a network or a satellite to the vehicular computer to be stored in the memory (EEPROM, RAM) or the like thereof at an arbitrary timing when there is a request or the like from the vehicular computer.

The navigation device 200 is equipped with an input device 201, an output device 202, a navigation map information storing unit 204, a first arithmetic processing unit 210, and a second arithmetic processing unit 220.

The input device 201 is configured from operating buttons or a microphone, and enables various operations or input settings by an operation or utterance by the user. The output device 202 is configured of a display device for displaying or outputting map information and the like.

The navigation map information storing unit 204 is stored with the navigation map information or the like to be output to the output device 202. In the navigation map information, the location, shape and posture or the like of each link constituting a road are expressed by a series of coordinates. Moreover, each link is tagged with the link identification information for identifying each link. Even though the definitions or the like of the series of coordinates in the navigation map information and the support map information are different due to the different specifications and data architectures therebetween, it is possible to match the links by tagging the identical links with common link identification information.

The first arithmetic processing unit 210 is configured to recognize the user position $p_0(i)$ and the destination position $p_2(i)$, to search a first navigation route $r_1(i)$, and to make the output device 202 output the first navigation route $r_1(i)$. The first arithmetic processing unit 210 is configured to make the navigation server 100 recognize the request Req(i) including an intermediate position included in the first navigation route $r_1(i)$, in addition to the user position $p_0(t)$ and the destination position $p_2(t)$. The user position $p_0(t)$ is measured based on signals received from artificial satellites by a GPS receiver constituting the navigation device 200, and also output signals of gyro sensors when necessary. The destination position $p_2(i)$ is input to the navigation device 200 by an operation of the input device 201 by the user.

The second arithmetic processing unit 220 is configured to recognize the link identification information or the coordinate position of a location point included in the support route R(i) searched by the navigation server 100 in response to the request Req(i). Based on the recognition result, the second arithmetic processing unit 220 is configured to search a second navigation route $r_2(i)$ for leading or guiding the user to the destination position $p_2(i)$ and output to the output device 202.

The navigation map information and the like stored in the navigation map information storing unit 204 is used when searching the first navigation route $r_1(i)$ and the second navigation route $r_2(i)$.

(The Function of the Navigation System)

Figure 2:
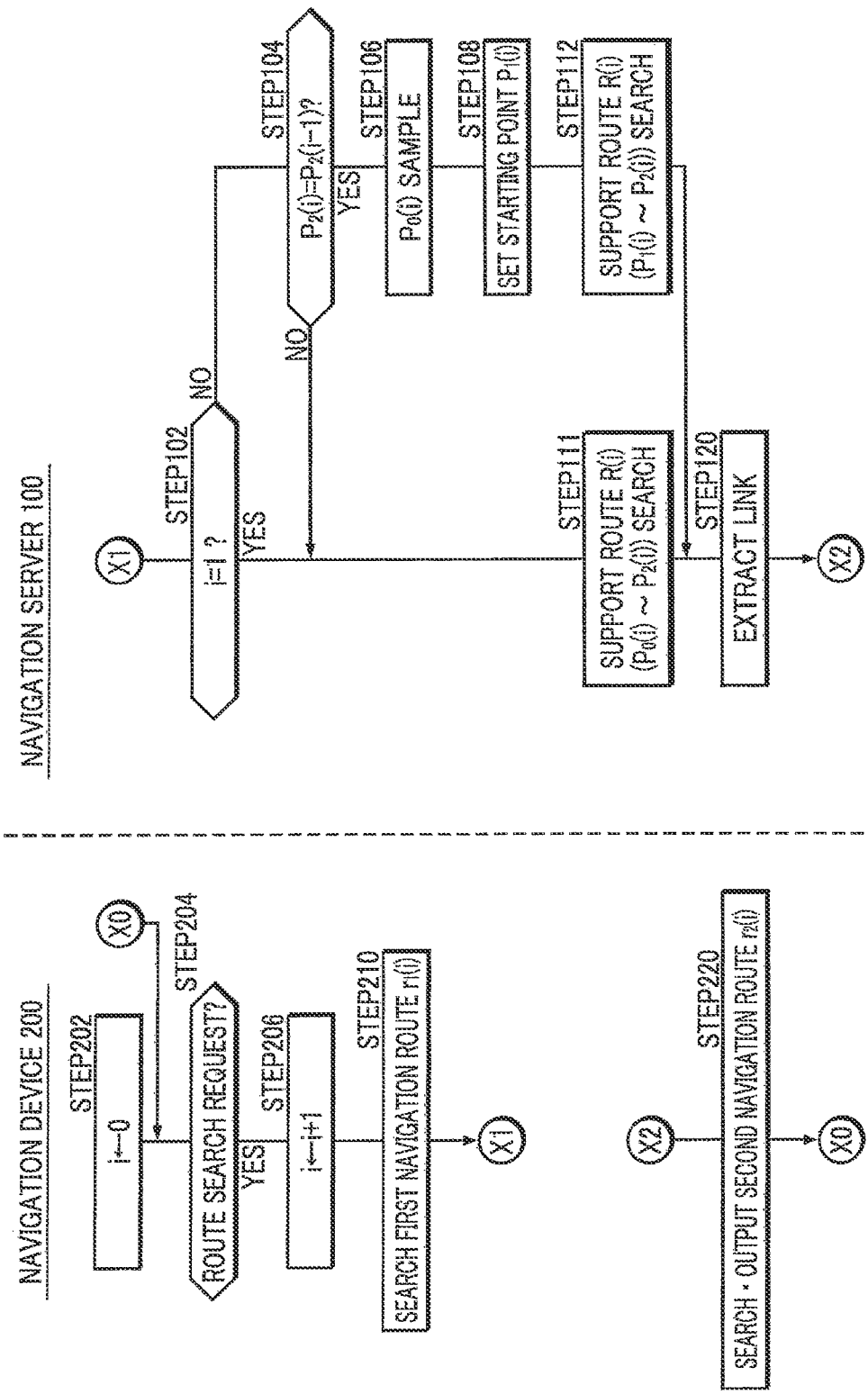
FIG. 2 is a view explaining the function of the navigation system of the present invention.

The index i expressing the number of times of the request for route search is reset to "0" when the IGN switch or the ACC switch of the vehicle is switched to ON from OFF, or to a switch of the navigation device 200 is switched to ON from OFF (FIG. 2/STEP202).

In the navigation device 200, the user position p(t) is constantly measured by the first arithmetic processing element 210 on the basis of GPS signals or the like received by a communication device. Furthermore, in a case the destination position $p_2(i)$ is input by the user via, the input device 201, the first arithmetic processing unit 210 recognizes this destination position $p_2(i)$.

Subsequently, existence or non-existence of a current route search request by the user via the input device 201 is determined by the first arithmetic processing unit 210 (FIG. 2/STEP204). When it is determined that there was a route search request (FIG. 2/STEP204 . . . YES), the index i is increased by "1" (FIG. 2/STEP206).

Furthermore, the first navigation route $r_1(i)$ for guiding the user from the user position $p_0(i)$ at this time point ti to the destination position $p_2(i)$ is searched by the first arithmetic processing unit 210 (FIG. 2/STEP210). By this, the first navigation route $r_1(i)$ connecting the user position $p_0(i)$ and the destination position $p_2(i)$ is output and displayed to the output device 202, as is shown by a dashed line in FIG. 3A.

Furthermore, a request Req(i) including one or a plurality of intermediate positions included in the first navigation route $r_1(i)$ in addition to the user position $p_0(i)$ and the destination position $p_2(i)$, is sent to the navigation server 100 by the first arithmetic processing unit 210 (FIG. 2/arrow X1). The request Req(i) is attached with navigation identification information for identifying the navigation device 200 or a user identification information for identifying a user, and also index i.

The search processing of the first navigation route $r_1(i)$ (FIG. 2/STEP210) may be abbreviated, and a request Req(i) not including the intermediate position included in the first navigation route $r_1(i)$ may be transmitted to the navigation server 100. The necessity of the search of the first navigation route $r_1(i)$ may be determined according to whether or not the user or the vehicle is moving on the basis of a time series of measurement positions of the user by the navigation device 200 or on the basis of output signals or the like of a vehicle speed sensor mounted in the vehicle.

According to the request Req(i), it is determined whether or not the index i is 1 by the first support arithmetic processing unit 110 in the navigation server 100 (FIG. 2/STEP102). This determination corresponds to a determination of existence or non-existence of a search history of the support route R(i) in the same moving time period of the user (such as a time period from the IGN switch or the like of the vehicle is switched ON until the same is switched OFF).

In a case where the index i is determined to be 1 (FIG. 2/STEP102 . . . YES), the support route R(i) for guiding the user from his/her position $p_1(i)$ by way of the intermediate position to the destination position $p_2(i)$ is searched by the first arithmetic processing unit 110 (FIG. 2/STEP 111).

Figure 3A:
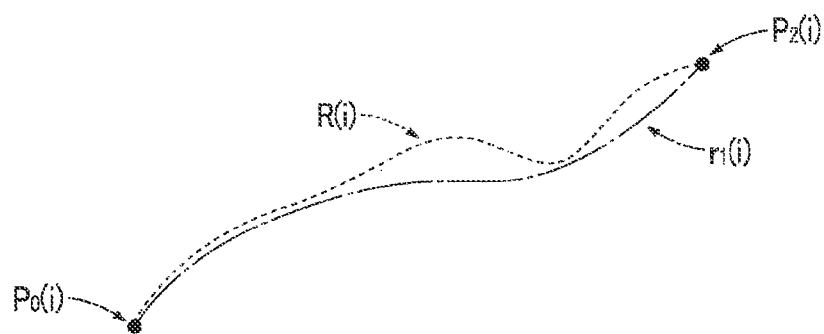
FIG. 3A and FIG. 3B are explanation views related to a support route and a navigation route.

By this, as is shown by a dashed line in FIG. 3A, the support route R(i) from the user position $p_0(i)$ to the destination position $p_2(i)$ included in the request Req(i) is searched similar to the first navigation route $r_1(i)$. The support route R(i) is searched according to a condition such as the travel distance or the predicted required time to the destination position $p_2(i)$ is shortest, or the fuel efficiency of the vehicle for travelling to the destination position $p_2(i)$ is best, or the like.

In a case where the index i is determined to be not 1 (determined as 2 or more) (FIG. 2/STEP102 . . . NO), it is further determined whether or not the current destination position $p_2(i)$ included in the current request Req(i) is same as the previous destination position $p_2(i-1)$ included in the previous request Req (i-1)(FIG. 2/STEP104).

If the determination result is negative (FIG. 2/STEP104 . . . NO), the support route R(i) from the user position $p_0(i)$ to the destination position $p_2(i)$ is searched similar as described before.

On the other hand, if the determination result is positive (FIG. 2/STEP104 . . . YES), the first support arithmetic processing unit 110 recognizes a situation in which there is a possibility to affect the travelling form of the user in the vicinity of the user position $p_0(i)$ (FIG. 2/STEP 106).

Such situation includes road traffic situations such as predicted required time for travelling, degree of traffic jam or existence/nonexistence of traffic jam, existence/non-existence of traffic accidents in the road the user is currently travelling recognized by the first road traffic information or the second road traffic information. Moreover, the situation includes weather situation such as the weather, temperature, humidity, rainfall amount, existence/nonexistence of accumulation of snow or icy roads, or the like in the road the user is currently travelling recognized by the weather information.

Thereafter, based on the recognition result, the first support arithmetic processing unit 110 sets a location point which is a designated distance $d_0(i)$ or more distant from the user position $p_0(i)$ included in the request Req(i) as a starting point $p_1(i)$ of the current support navigation route R(i) (FIG. 2/STEP108).

The designated distance $d_0(i)$ is set to be a value equal to or more than the predicted moving distance of the user during the time lag (designated time period) from when the request Req(i) is transmitted from the navigation device 200 until the navigation route r(i) based on the search result of the support route R(i) as will be described later is output at the navigation device 200. The predicted moving distance can be set in flux according to the recognition result, for example, to be longer in a case the predicted required time for travelling is shorter in the road the user is travelling (and adjacent to the user position), or the like.

Figure 3B:
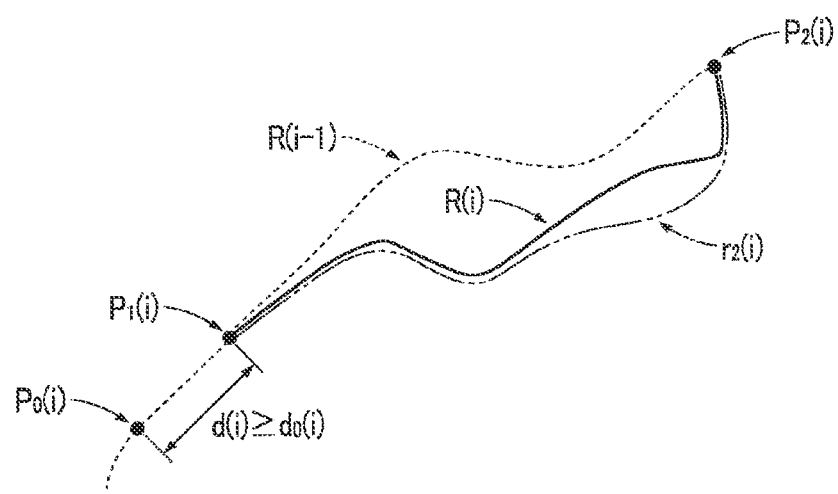

Accordingly, as is shown in FIG. 3B, a location point which is on the previous support route R(i−1)(dashed line) and which is distant from the user position $P_0(i)$ by a distance d(i) which is a designated distance $d_0(i)$ or more, is set as the starting point $p_1(i)$.

Then, the first support arithmetic processing unit 110 searches a support navigation route R(i) for guiding the user from the starting point (a predicted position of the user after the time lag has passed) $p_1(i)$ to the destination position $p_2(i)$(FIG. 2/STEP112). By doing so, as is shown in a solid line in FIG. 3B, the support route R(i) to the destination position $p_2(i)$ from the predicted position of the user $p_1(i)$ after the time lag has passed, is searched.

Then, the second support arithmetic processing unit 120 transmits the link identification information for identifying at least a part of the plurality of links constituting the support route R(i), to the navigation device 200 identified by the navigation identification information (FIG. 2/arrow X2).

In the navigation device 200, the second arithmetic processing unit 220 searches for a second navigation route $r_2(i)$ including the link identified by the link identification information and for guiding the user to the destination position $p_2(i)$ (FIG. 2/STEP220).

As such, as is shown in dashed-two-dotted line in FIG. 3B, the second navigation route $r_2(i)$ connecting the predicted user position $p_1(i)$ and the destination position $p_2(i)$ is output and displayed on the output device 202. Other than this, the first navigation route $r_1(i)$ connecting a measured position of the user $p_0(i)$ and the destination position $p_2(i)$ can be output and displayed on the output device 202.

(Effect of the Navigation System)

According to the navigation system exerting the above-functions, the navigation server 100 searches a support route R(i) for guiding the user to the destination position $p_2(i)$ when a request Req(i)(i=1) is made including the user position $p_0(i)$ and the destination position $p_2(i)$ from the navigation device 200 (refer to FIG. 2/STEP 111, FIG. 3A). Furthermore, according to the link included in the support route as the search result of the support route R(i), the navigation device 200 searches and outputs the second navigation route $r_2(i)$ (refer to FIG. 2/STEP220). By this, the user is able to move in a form of being guided by the navigation device 200 according to this navigation route $r_2(i)$.

Thereafter, in a case where there is a current request Req(i)(i>1) including a current destination position $p_2(i)$ which is same as the previous destination position $p_2(i-1)$ from the navigation device 200, a current support route R(i) having a location point $p_1(i)$ which is on the previous support route R(i−1) and distant from the use position $p_0(i)$ included in the request Req(i) for a designated distance or more as the starting point, is searched (refer to FIG. 2/STEP112, FIG. 3B). As mentioned above, the designated distance $d_0(i)$ is set to a value equal to or more than the predicted moving distance of the user during the time period (time lag) after the request Req(i) from the navigation device 200 to the navigation server 100, until the current navigation route r(i) is searched and output by the navigation device 200 according to the request Req(i).

In this regard, when the current second navigation route $r_2(i)$ according to the current request is output to the navigation device 200, the current second navigation route $r_2(i)$ will start from the user position $p_0$ at that time point or from a position closer to the destination position $p_2(i)$ than this user position. Especially, in a case where the user is travelling according to the navigation route r(i−1)(the previous first navigation route $r_1(i-1)$ or the previous second navigation route $r_2(i-1)$) based on the search result of the support route R(i−1) according to the previous request Req(i−1), the current second navigation route $r_2(i)$ will start from the route on which the user is travelling.

Therefore, the user is not forced to return back or change the course considerably or the like, and can smoothly travel along the current second navigation route $r_2(i)$. Therefore, the utility value of the navigation route (especially the second navigation route $r_2(i)$) according to the current request Req(i) is improved in consideration of the user position $p_0(i)$.

(Other Embodiments of the Present Invention)

In the navigation server, the first support arithmetic processing unit 110 may be configured to change the support route R(i) according to any one of the following two modes. One of the two modes may be selected according to the user's will via the input device 201 of the navigation device 200.

According to a first mode, at the navigation server 100, existence or non-existence of a change in the road traffic situation or the weather situation or the like in at least the portion the user is planned to pass in the support route R(i) (refer to FIG. 2/STEP106), is constantly recognized, and then the support route R(i) is changed according to the existence of change. According to a second mode, existence or non-existence of the situation change is inquired to the navigation server 100 from the navigation device 200 periodically or intermittently, and after the existence or non-existence of the situation change is intermittently recognized at the time of the inquiry at the navigation server 100, then the support route R(i) is changed according to the existence of the change.

The invention claimed is:

1. A navigation server for supporting a guidance of a user by a navigation device based on communication with the navigation device, comprising
   a navigation server communication device in communication with the navigation device, and a navigation server processor and navigation server memory storing a navigation server program that, when executed by the navigation server processor, causes the navigation server processor to function as:
   a first navigation server support arithmetic processing unit that searches for a support route for guiding the user to a destination position based on communication with the navigation device, on a condition that a request including a position of the user, the destination position, and an index expressing a number of times a route search request has been made is recognized; and
   a second navigation server support arithmetic processing unit that makes the navigation device recognize a location point or a link included in the support route searched by the first navigation server support arithmetic processing unit based on communication with the navigation device,
   wherein the first navigation server support arithmetic processing unit searches for a current support route having a location point which is on a previous support route and which is a designated distance or more distant from the position of the user included in a current request as a starting point, on a condition that the current request including the index at a value of two or more and the destination position that is the same as the previous support route is recognized, and the first navigation server support arithmetic processing unit searches for a current support route having the position of the user as the staring point, on a condition that the current request including the index at a value of one or the destination position that is different from the previous support route is recognized.

2. The navigation server according to claim 1, wherein the first navigation server support arithmetic processing unit recognizes a factor which affects a traveling form of the user, and sets the designated distance or the starting point of the current support route according to the factor.

3. A navigation device for guiding a user based on communication with the navigation server of claim 1, comprising
   a navigation device communication device in communication with the navigation server, and a navigation device processor and navigation device memory storing a navigation device program that, when executed by the navigation device processor, causes the navigation device processor to function as:
   a first navigation device arithmetic processing unit that searches for a first navigation route for guiding the user from the position of the user to the destination position and recognizes the position of the user, the destination position, and an index expressing a number of times a route search request has been made, and makes the navigation server recognize the request including the position of the user, the destination position, and the index; and
   a second navigation device arithmetic processing unit that recognizes the location point or the link included in the support route searched by the navigation server according to the request, and searches and outputs a second navigation route for guiding the user to the destination position based on the recognition result.

4. The navigation device according to claim 3, wherein the first navigation device arithmetic processing unit searches for a navigation route connecting the user and the destination position independent of the support route, and makes the navigation server recognize the request further including an intermediate position included in the navigation route.

5. A navigation system comprising a navigation device and a navigation server for supporting a guidance of a user by the navigation device based on communication with the navigation device,
   the navigation server comprising a navigation server communication device in communication with the navigation device, and a navigation server processor and navigation server memory storing a navigation server program that, when executed by the navigation server processor, causes the navigation server processor to function as:
   a first navigation server support arithmetic processing unit that searches for a support route for guiding the user to a destination position based on communication with the navigation device, on a condition that a request including a position of the user, the destination position, and an index expressing a number of times a route search request has been made is recognized; and
   a second navigation server support arithmetic processing unit that makes the navigation device recognize a location point or a link included in the support route searched by the first navigation server support arithmetic processing unit based on communication with the navigation device,
   wherein the first support arithmetic processing unit searches for a current support route having a location point which is on a previous support route and which is a designated distance or more distant from the position of the user included in a current request as a starting point, on a condition that the current request including the index value at a value of two or more and the destination position that is the same as the previous support route is recognized, and the first navigation server support arithmetic processing unit searches for a current support route having the position of the user as the staring point, on a condition that the current request including the index at a value of one or the destination position that is different from the previous support route is recognized,
   the navigation device comprising a navigation device communication device in communication with the navigation server, and a navigation device processor and navigation device memory storing a navigation device program that, when executed by the navigation device processor, causes the navigation device processor to function as:
   a first navigation device arithmetic processing unit that searches for a first navigation route for guiding the user from the position of the user to the destination position and recognizes the position of the user, the destination position, and the index, and makes the navigation server recognize the request including the position of the user, the destination position, and the index; and
   a second navigation device arithmetic processing unit that recognizes the location point or a link included in the support route searched by the navigation server according to the request, and searches and outputs a second navigation route for guiding the user to the destination position based on the recognition result.

* * * * *